April 13, 1954     T. A. HESS     2,675,033
MOUNTING MEANS FOR RIP FENCES FOR TABLE SAWS
Filed Sept. 20, 1950     2 Sheets-Sheet 1
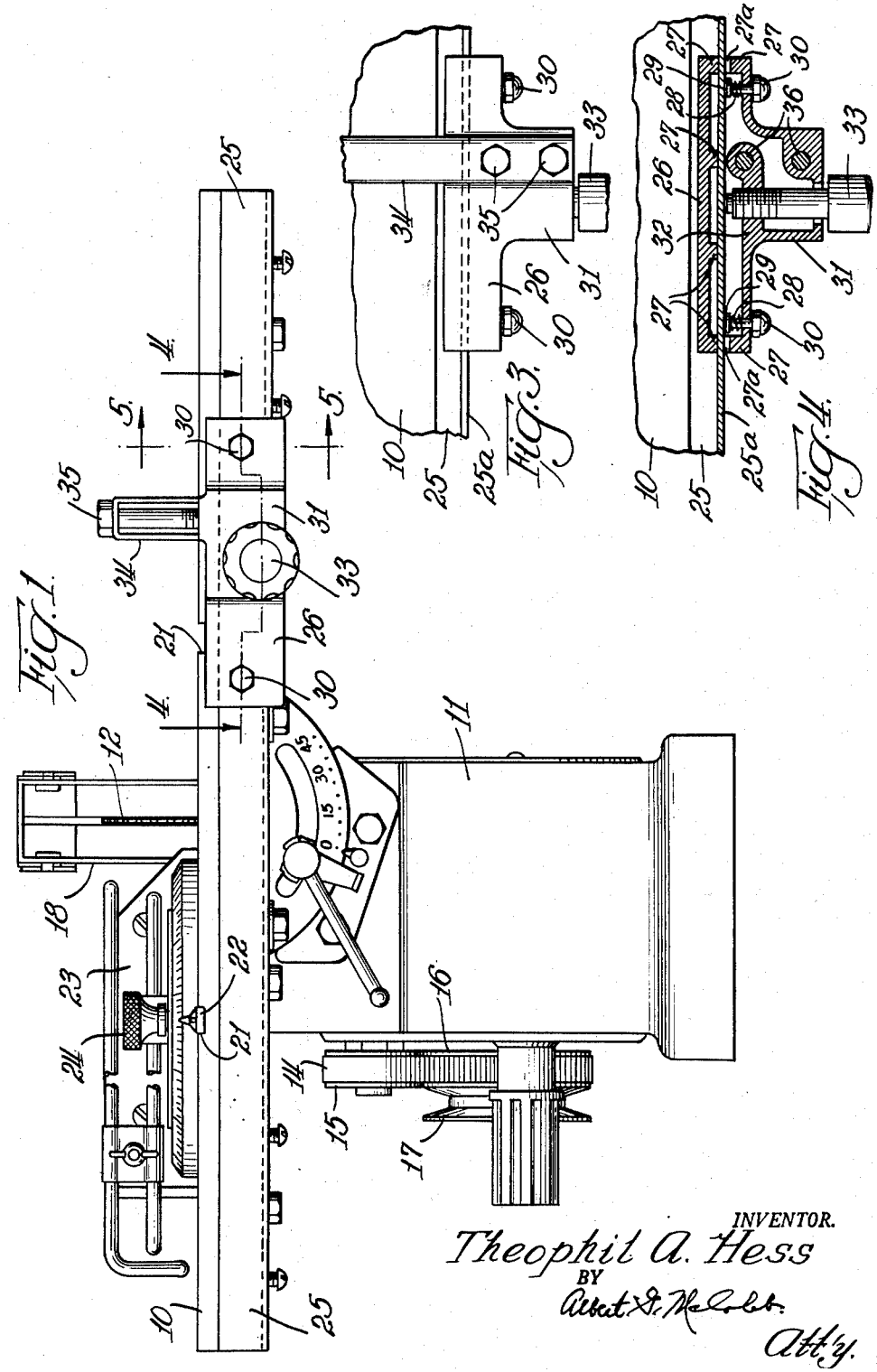
INVENTOR.
Theophil A. Hess April 13, 1954           T. A. HESS           2,675,033
MOUNTING MEANS FOR RIP FENCES FOR TABLE SAWS
Filed Sept. 20, 1950           2 Sheets-Sheet 2
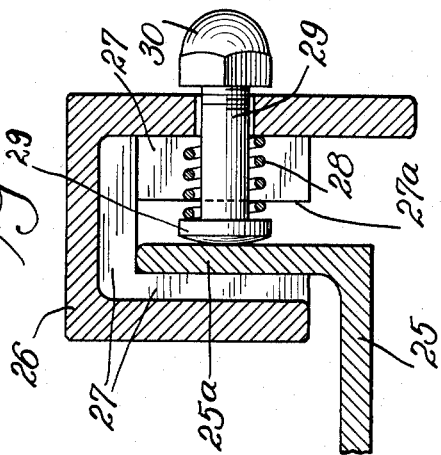
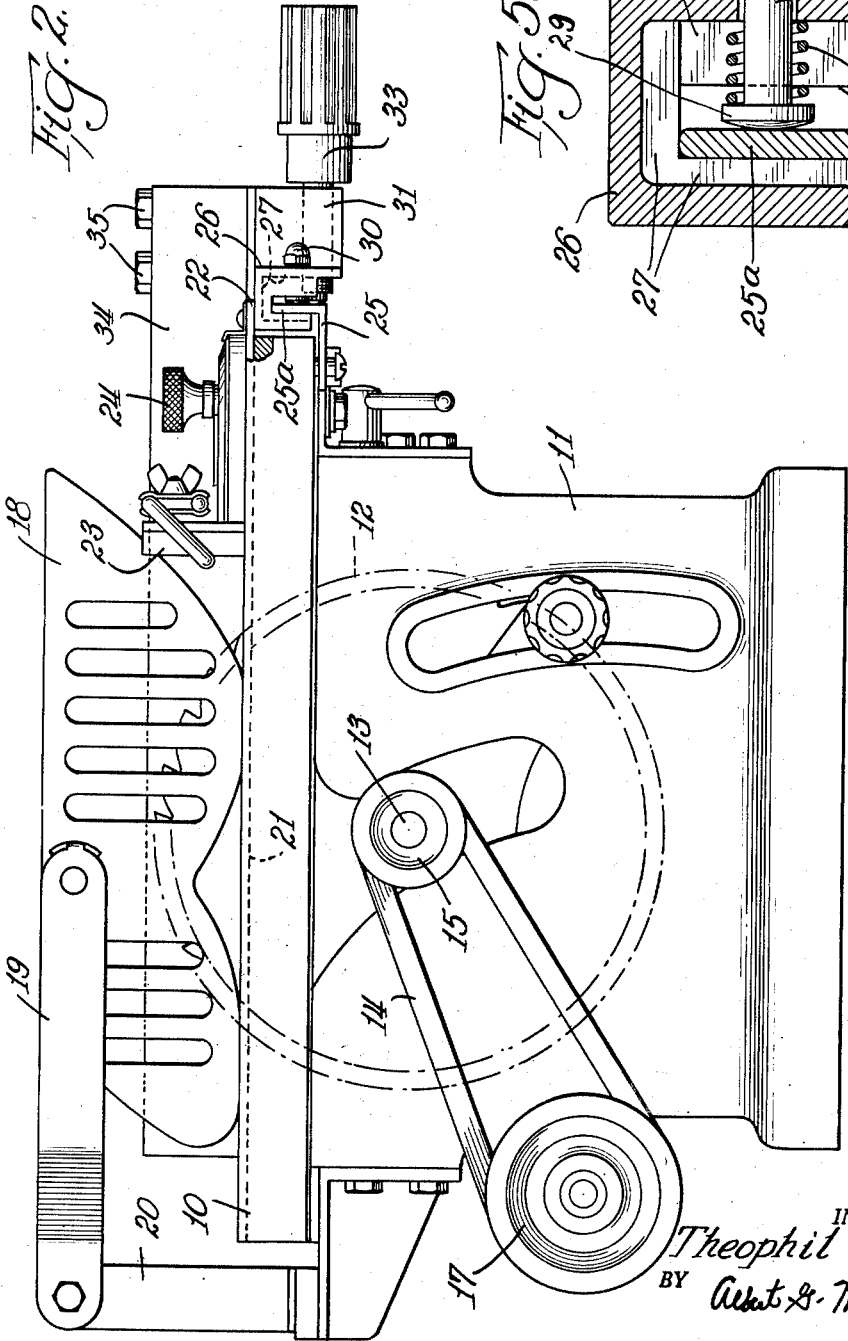
INVENTOR.
Theophil A. Hess
BY
Albert G. McColl
Att'y.

Patented Apr. 13, 1954

2,675,033

UNITED STATES PATENT OFFICE 2,675,033

MOUNTING MEANS FOR RIP FENCES FOR TABLE SAWS

Theophil A. Hess, Chicago, Ill., assignor to Duro Metal Products Co., Chicago, Ill., a corporation of Illinois Application September 20, 1950, Serial No. 185,833

1 Claim. (Cl. 143—174)

This invention relates to table saws and particularly to the means for mounting the rip fence adjustably in position on the table of such a saw. It is the object of my invention to provide mounting means for a rip fence of such construction and arrangement that the structure can be produced readily and economically so as to be strong and to have great stability and durability, while at the same time being easily and quickly adjustable for holding the rip fence in the required position for cutting a board or the like to any desired width. To this end, it is one of the objects of my invention to provide an improved guide device for supporting the rip fence movably in position on a suitable guide bar for ensuring that the rip fence shall be held at all times in the desired parallel arrangement with respect to the saw blade so as to resist moderate pressure thereon which might have a tendency to force the fence out of its normal operative position.

Other objects and advantages of the invention will be apparent from the following description and the accompanying drawings in which similar characters of reference indicate similar parts throughout the several views.

In the two sheets of drawings:

Fig. 1 is a side view of a table saw embodying my improved construction;

Fig. 2 is an end view of the machine as seen from the left in Fig. 1;

Fig. 3 is a top plan view of a fragmentary portion of the machine showing the means for holding the rip fence in position over the table of the machine;

Fig. 4 is a horizontal sectional view taken substantially at the line 4—4 in Fig. 1; and Fig. 5 is a vertical sectional view taken on a substantially enlarged scale at the line 5—5 in Fig. 1.

In my improved machine, a table 10 is supported by standard 11 which may be of any approved conventional form. A circular saw 12 is rotatably mounted in position on the standard by means of a spindle 13 which is movable vertically for permitting the saw to be set at any desired point of elevation, as is usual in machines of this type. The spindle 13 is driven by an endless belt 14 operating on pulleys 15 and 16, the latter of which is formed integrally with a pulley 17 adapted to be driven by power from any suitable source not shown. The table 10 is pivotally mounted on the standard 11 so as to tilt in either clockwise direction or counterclockwise direction in Fig. 1 with respect to the standard and the saw blade 12.

A guard 18 of any approved type is pivotally mounted on arms 19 which in turn are pivotally mounted on a bracket 20 rising from the standard 11, such guard being adapted to act as a shield for protecting the worker from accidental contact with the saw blade. The table 10 is provided with shallow grooves 21 in its top face for holding a mitre gauge device slidably in position with its slide bar member 22 parallel with the plane of the saw blade, said slide bar having a head 23 adjustably mounted on a vertical axis thereon and clamped in the desired angular position with respect to the slide bar by means comprising a knurled nut 24, as is usual in devices of this type.

Across the end of the machine at the right in Fig. 2, I have provided an angular guide bar 25 mounted rigidly in position at right angles to the plane of the saw blade, with its flange portion 25a projecting upwardly in spaced relationship to the edge of the table. Upon this upwardly projecting flange I have slidably mounted a guide block 26 in the form of a metal casting comprising in effect a channel member. As is best shown in Figs. 2 and 5, each of the flanges and the web of such channel member 26 is provided on its inner face with a plurality of ribs 27 there-across, which serve to strengthen the block and also to space the block with respect to the flange 25a on which it is slidably mounted.

For holding the guide block 26 pressed yieldingly in the direction away from the table 10, I have provided coiled springs 28 mounted on bolts 29 loose in openings in the outside flange of the channel member 26, as is best shown in Fig. 5, such bolts having rounded head portions in position to engage the outer face of the flange 25a of the guide bar. As is best shown in Fig. 3, the guide block is substantially elongated in the direction in which it is slidable along the guide bar 25, the bolts 29 and springs 28 being positioned in substantially spaced relationship to each other near the opposite ends of the guide block.

As is clearly shown in Fig. 4, the bolts 29 bear on the face of the flange 25a immediately adjacent to the notches 27a between the oppositely disposed ribs 27 at the ends of the guide block. This arrangement serves to hold the guide block firmly in the desired angular position with respect to the flange 25a during the adjustment of the block along the flange. Nuts 30 on the outer ends of the bolts serve to draw the bolts outwardly against the action of the springs 28 for permitting the ready mounting of the guide block on the flange 25a.

At about its middle portion lengthwise of the block, the guide block 26 is provided with an outwardly extending housing portion 31 formed integrally with the channel portion, with the top wall of the housing portion in horizontal alignment with the web portion of the channel. As is best shown in Fig. 4, a heavy plate 32 is provided between the housing and the flange 25a, formed integrally with the guide block and supporting a set screw 33 adjustably in position for engagement with the flange 25a for locking the block firmly in position with respect to the flange.

On the top face of the guide block 26 and the housing 31, I have mounted a rip fence 34 in the form of a comparatively deep channel member in inverted position, held in position by two machine screws 35 extending through openings in the web of the member 34 and into threaded openings 36 in suitable portions of the guide block. As is clearly shown in Fig. 4, one of the openings 36 is provided in the plate portion 32, and the other in a substantially thickened portion of the wall of the housing 31. The means comprising the machine screws 35 hold the rip fence very strongly in position parallel with the saw blade 12 in any adjusted position to which the guide block is moved along the guide bar 25.

By the use of my improved construction, a very effective device is provided, capable of being produced easily and economically, readily adjustable, and of such strength and rigidity as to be reliable for the purposes for which it is employed.

While I have illustrated a preferred embodiment of the invention, many modifications may be made without departing from the spirit of the invention, and I do not wish to be limited to the precise details of construction set forth, except so far as the same may be specifically claimed, but desire rather to avail myself of all changes within the scope of the appended claim.

Having thus described my invention, what I claim as new and desire to secure by Letters Patent of the United States is:

Means for mounting a rip fence on the table of a power saw, said mounting means comprising a guide bar fixedly mounted on said table in perpendicular relation to the saw blade, a guide block having an open groove and provided at one side of said groove with two end projections and two intermediate projections engaging one face of the guide bar and at the other side with two end projections near but somewhat spaced from the opposite face of the guide bar, a set screw mounted in the guide block so as to be engageable with the said other face of the guide bar between the intermediate projections, and a pair of continuously operable adjustable holding means at the said other face of the guide bar adjacent the end projections at said other face, each holding means comprising a bolt engageable with the said other face of the guide bar and slidable in the guide block, a spring surrounding the bolt and urging the bolt toward the said other face of the guide bar to maintain a constant angular relation between the guide block and guide bar during adjusting movement of the guide block along the guide bar, and a nut on the bolt outside of the guide block.

References Cited in the file of this patent

UNITED STATES PATENTS

| Number | Name | Date |
| --- | --- | --- |
| 221,804 | Gordon | Nov. 18, 1879 |
| 1,784,644 | Teutsch | Dec. 9, 1930 |
| 2,075,282 | Hedgpeth | Mar. 30, 1937 |
| 2,102,857 | Schafer | Dec. 21, 1937 |
| 2,140,323 | Lonskey | Dec. 13, 1938 |
| 2,166,703 | Boice | July 18, 1939 |
| 2,267,937 | Mattison | Dec. 30, 1941 |
| 2,521,302 | Musselman | Sept. 5, 1950 |
| 2,525,894 | Graham | Oct. 17, 1950 |
| 2,530,867 | Galanga | Nov. 21, 1950 |
| 2,556,548 | Modderman | June 12, 1951 |